(12) United States Patent
Yang et al.

(10) Patent No.: US 11,538,073 B2
(45) Date of Patent: Dec. 27, 2022

(54) ELECTRONIC APPARATUS AND METHOD FOR OPERATING THE SAME

(71) Applicant: LG ELECTRONICS INC., Seoul (KR)

(72) Inventors: Siyoung Yang, Seoul (KR); Yongchul Park, Seoul (KR); Sungmin Han, Seoul (KR); Sangki Kim, Seoul (KR); Juyeong Jang, Seoul (KR); Minook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 17 days.

(21) Appl. No.: 16/842,617

(22) Filed: Apr. 7, 2020

(65) Prior Publication Data

US 2021/0192581 A1    Jun. 24, 2021

(30) Foreign Application Priority Data

Dec. 19, 2019 (KR) ........................ 10-2019-0171111

(51) Int. Cl.
*G06F 40/35* (2020.01)
*G06Q 30/02* (2012.01)
*H04L 51/02* (2022.01)
*G06F 16/332* (2019.01)

(52) U.S. Cl.
CPC ..... *G06Q 30/0281* (2013.01); *G06F 16/3329* (2019.01); *G06F 40/35* (2020.01); *H04L 51/02* (2013.01)

(58) Field of Classification Search
CPC ........ G06Q 30/0281; G06Q 10/063112; G06F 40/30; G06F 40/35; G06F 16/3329; G06F 16/335; H04L 51/02; H04L 51/14; H04L 51/32

See application file for complete search history.

(56) References Cited

U.S. PATENT DOCUMENTS

| 8,468,143 | B1* | 6/2013 | Oztekin | G06F 16/90335 |
| | | | | 707/706 |
| 10,645,225 | B1* | 5/2020 | Stoops | H04M 7/0045 |
| 10,742,815 | B1* | 8/2020 | Tomlinson | G06F 16/951 |
| 10,750,019 | B1* | 8/2020 | Petrovykh | G06N 5/04 |
| 2009/0012833 | A1* | 1/2009 | Kuhlke | G06F 16/335 |
| | | | | 705/7.14 |
| 2015/0347954 | A1* | 12/2015 | Stern | G06Q 10/063112 |
| | | | | 705/7.14 |
| 2016/0071022 | A1* | 3/2016 | Bruno | G06F 16/3349 |
| | | | | 706/12 |
| 2016/0196313 | A1* | 7/2016 | Allen | G06F 16/24578 |
| | | | | 707/723 |
| 2017/0109390 | A1* | 4/2017 | Bradley | G06F 16/335 |

(Continued)

FOREIGN PATENT DOCUMENTS

KR    1020190061239    6/2019

*Primary Examiner* — Wilson W Tsui
(74) *Attorney, Agent, or Firm* — Lee, Hong, Degerman, Kang & Waimey

(57) ABSTRACT

An electronic device is disclosed. The electronic device includes a memory and a processor. The electronic device may execute an artificial intelligence (AI) algorithm and/or a machine learning algorithm, and perform communications with other electronic devices in a 5G communication network. Accordingly, user convenience can be significantly improved.

18 Claims, 8 Drawing Sheets

(56) References Cited

U.S. PATENT DOCUMENTS

| | | | |
|---|---|---|---|
| 2018/0189382 A1* | 7/2018 | Mowatt | G06Q 50/01 |
| 2018/0287968 A1* | 10/2018 | Koukoumidis | G06F 40/289 |
| 2018/0293483 A1* | 10/2018 | Abramson | H04L 51/02 |
| 2019/0156222 A1* | 5/2019 | Emma | G06F 16/3329 |
| 2019/0188583 A1* | 6/2019 | Appel | G06N 5/04 |
| 2019/0199658 A1* | 6/2019 | Kim | H04L 51/14 |
| 2019/0297031 A1* | 9/2019 | Basheer | H04L 51/02 |

\* cited by examiner

[FIG. 1]
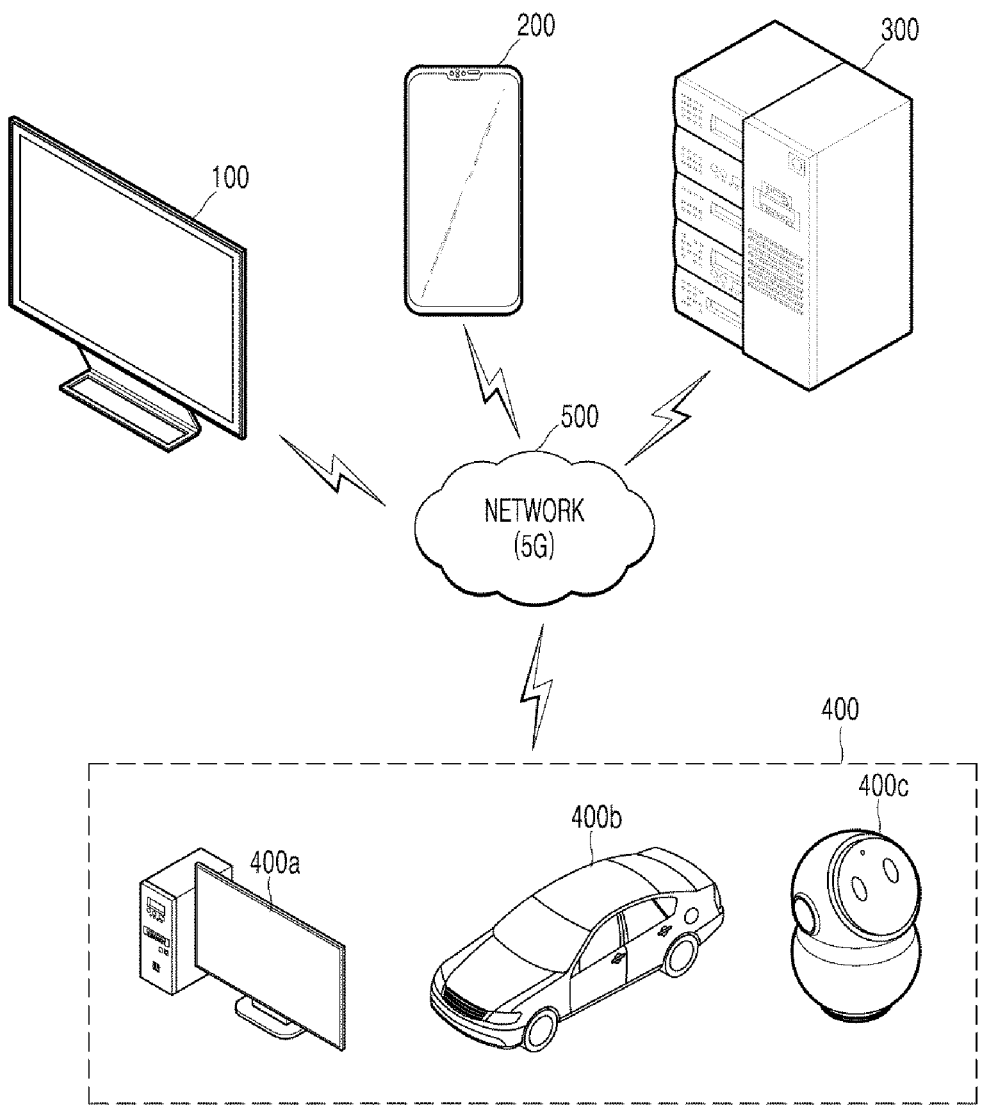

[FIG. 2]
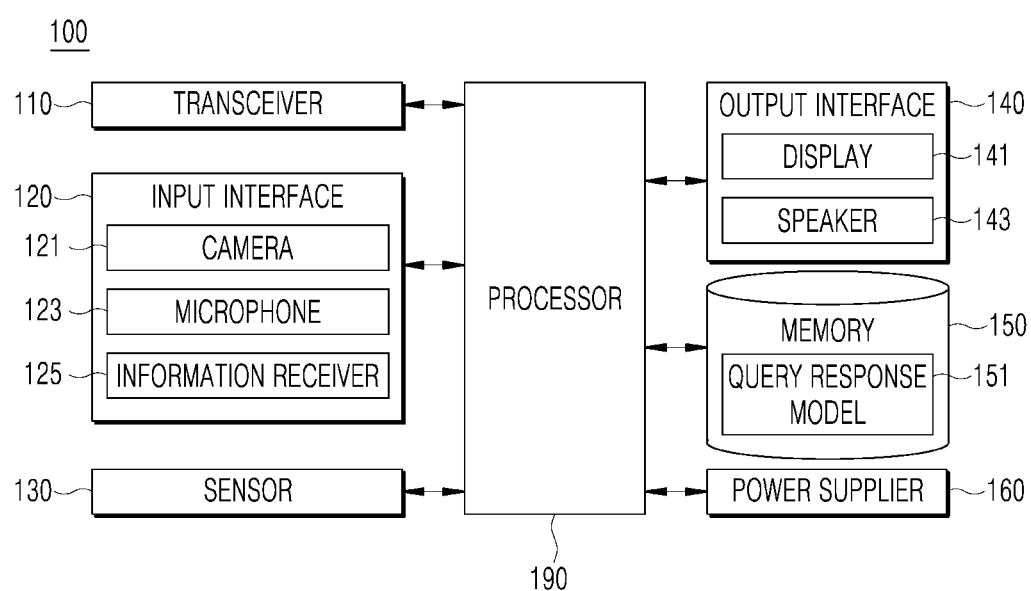

[FIG. 3]
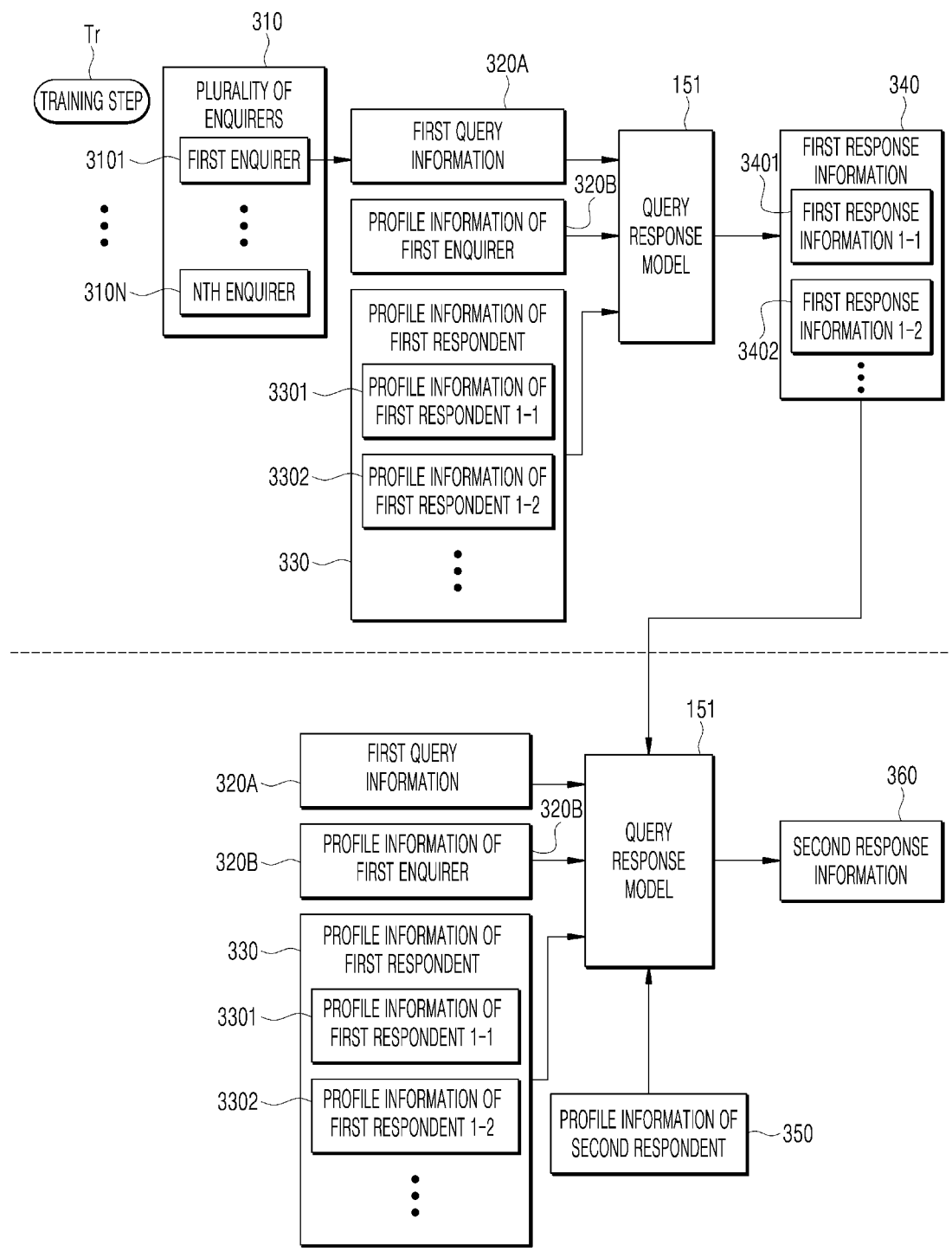

[FIG. 4]
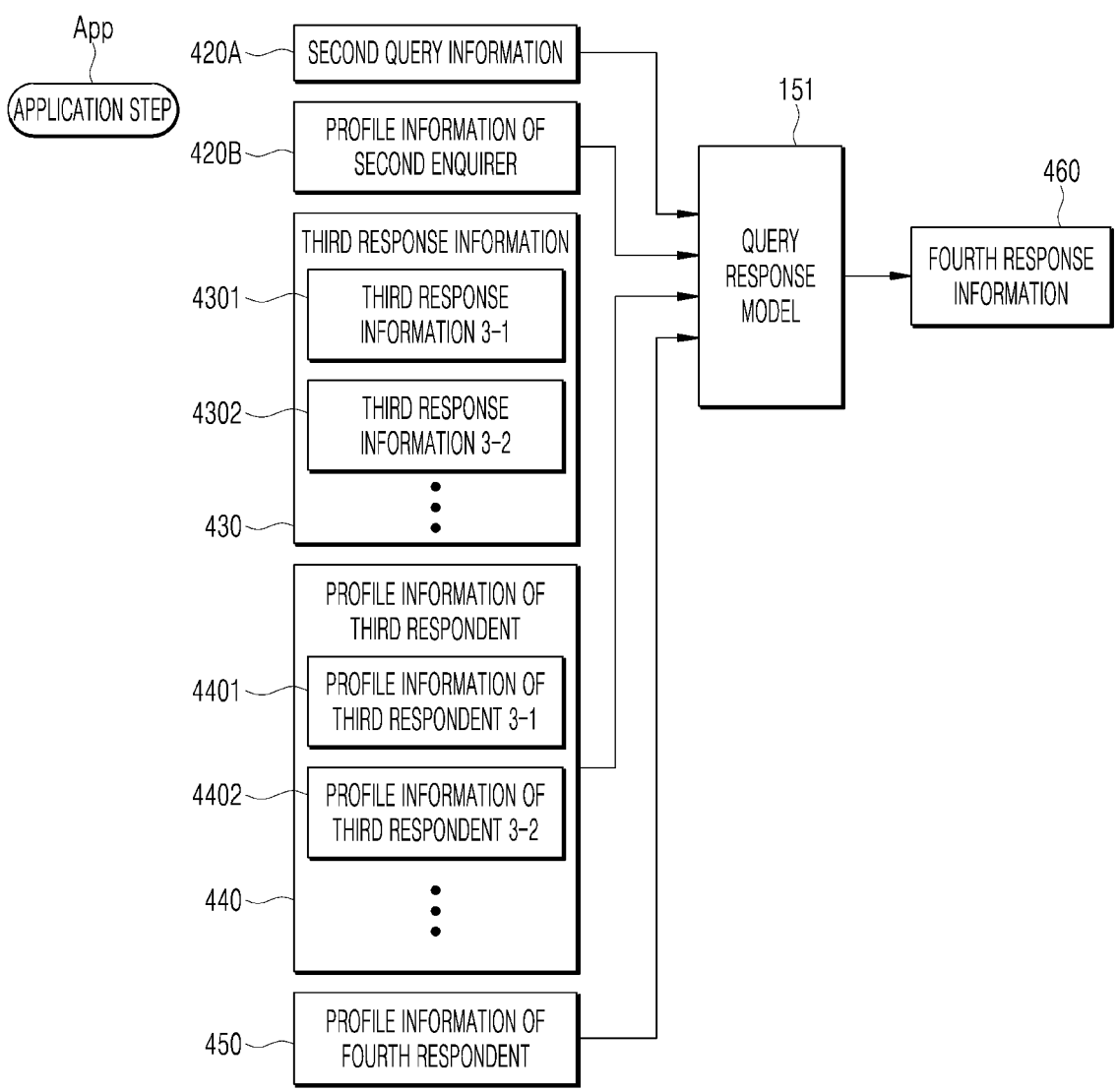

[FIG. 5]

| 141 | PHOTO | NAME | SEX | AGE | OCCUPATION | RESIDENTIAL AREA | INTEREST FIELD | RESPONSE OPTION |
|---|---|---|---|---|---|---|---|---|
| 1 | | AAA | MALE | 30S | COMEDIAN | AAA1 | LOVE | "1F" |
| 2 | | BBB | FEMALE | 20S | DESIGNER | BBB1 | INSURANCE | |
| 3 | | CCC | MALE | 40S | SINGER | CCC1 | FINANCE | "1S" |
| 4 | | DDD | FEMALE | 50S | ACTRESS | DDD1 | REAL ESTATE | "2" |

[FIG. 6]
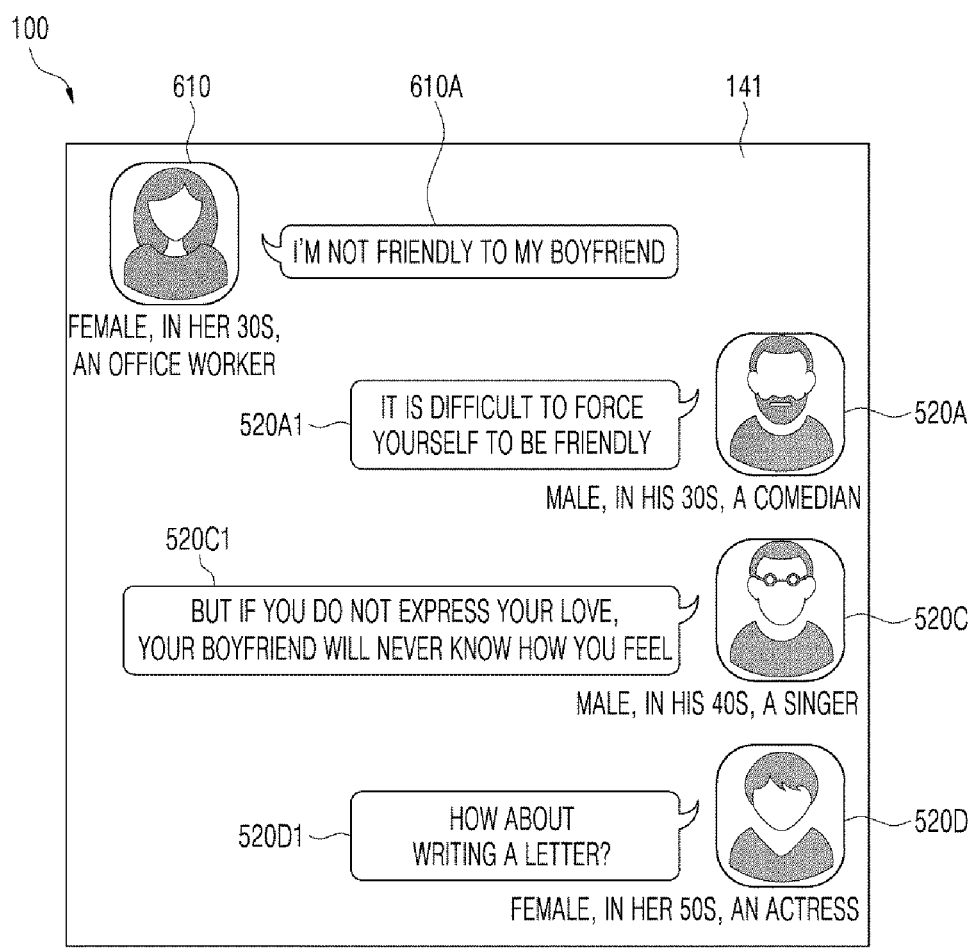

[FIG. 7]
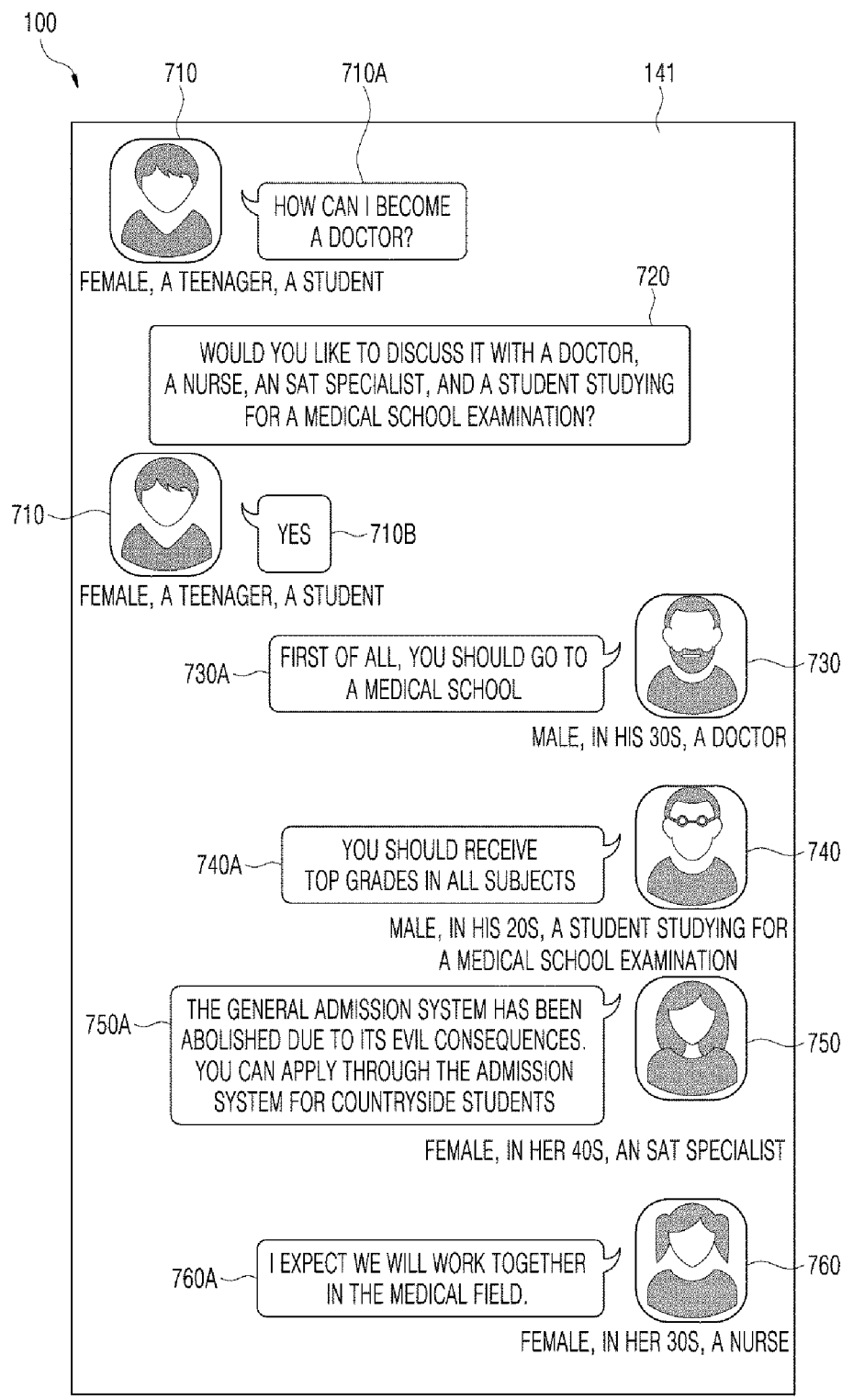

[FIG. 8]
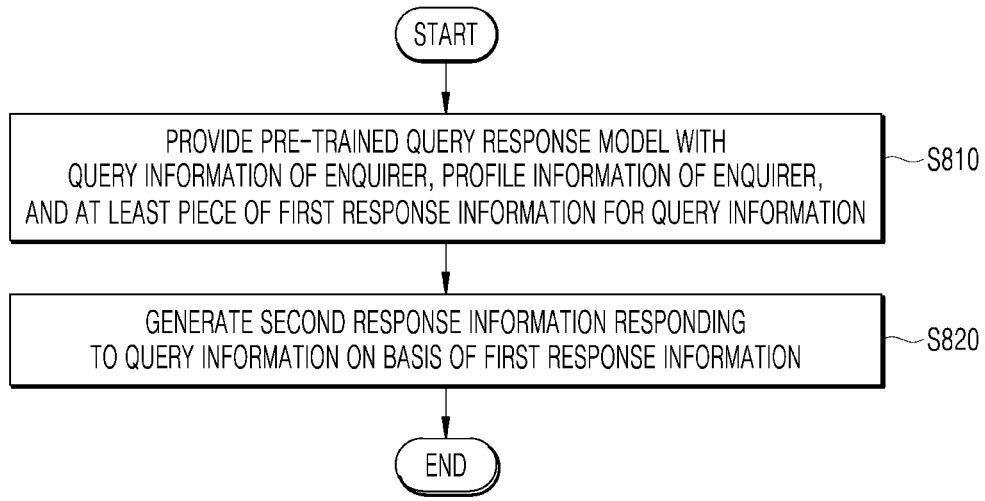

ELECTRONIC APPARATUS AND METHOD FOR OPERATING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0171111, filed on Dec. 19, 2019, the contents of which are all hereby incorporated by reference herein in their entirety.

BACKGROUND

1. Technical Field

The present disclosure relates to an electronic device providing various responses to a query and a method for operating the same.

2. Description of Related Art

As technology advances, various services to which speech recognition techniques and natural language interpretation techniques are applied have recently been introduced in the field of information communication technology (ICT). One of such services is a "chatbot," which is a computer program that performs a specific operation through conversation with humans by means of speech or text.

An electronic device with a chatbot of related art 1 can provide users with a conversation service, but the chatbot of related art 1 can only offer limited opinions in limited fields, and thus cannot provide various user-customized opinions in various fields.

Related Art 1: Korean Patent Application Publication No. 10-2019-0061239 (laid-open on Jun. 5, 2019)

SUMMARY OF THE INVENTION

An aspect of the present disclosure is directed to providing an electronic device which provides a customized response to a query of a user and a method for operating the same.

Another aspect of the present disclosure is directed to providing an electronic device in which chatbots having different profiles from each other may offer various opinions with respect to a query of a user and a method for operating the same.

Yet another aspect of the present disclosure is directed to providing an electronic device which generates response information based on responses of chatbots having different profiles from each other.

The present disclosure is not limited to what has been described above, and other aspects not mentioned herein will be apparent from the following description to one of ordinary skill in the art to which the present disclosure pertains.

An electronic device according to an embodiment of the present disclosure may include a memory configured to store a pre-trained query response model, and a processor configured to, in an application step, generate response information corresponding to query information of an enquirer.

The processor may be configured to provide the query response model with the query information, profile information of the enquirer, and at least one piece of first response information responding to the query information, to thereby generate second response information based on the first response information.

A method for operating an electronic device according to an embodiment of the present disclosure may include: providing a pre-trained query response model with query information of an enquirer, profile information of the enquirer, and at least one piece of first response information responding to the query information; and on the basis of the first response information, generating second response information that responds to the query information.

According to various embodiments of the present disclosure, response information based on the profile of the user may be automatically generated, and various response information corresponding to a query of the user may be generated. Accordingly, user convenience may be improved.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 1 is a view illustrating a 5G network-based cloud system according to an embodiment of the present disclosure.

FIG. 2 is a block diagram illustrating a configuration of an electronic device according to an embodiment of the present disclosure.

FIG. 3 is a block diagram for explaining a method for generating a query response model through training according to an embodiment of the present disclosure.

FIG. 4 is a block diagram for explaining a method for applying a generated query response model according to an embodiment of the present disclosure.

FIG. 5 is an illustration for explaining an interface for selecting a respondent from among a plurality of respondents having different profile information from one another according to an embodiment of the present disclosure.

FIGS. 6 and 7 are illustrations for explaining an operation of an electronic device providing various responses to a query in a certain field according to an embodiment of the present disclosure.

FIG. 8 is a sequence diagram for explaining a method for operating an electronic device according to an embodiment of the present disclosure.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, fluids, or other matter between the so-described components.

The term "or" as used herein is to be interpreted as an inclusive or meaning any one or any combination. Therefore, "A, B or C" means any of the following: "A; B; C; A and B; A and C; B and C; A, B and C." An exception to this definition will occur only when a combination of elements, functions, steps or acts are in some way inherently mutually exclusive.

Since artificial intelligence techniques may be utilized in various embodiments of the present disclosure, artificial intelligence will be generally described first.

Artificial intelligence (AI) refers to a field of studying artificial intelligence or a methodology for creating the same. Moreover, machine learning refers to a field of defining various problems dealt with in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. An ANN may be defined by a connection pattern between neurons on different layers, a learning process for updating model parameters, and an activation function for generating an output value.

An ANN may include an input layer and an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

Machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Reference will now be made in detail to embodiments of the present disclosure, examples of which are illustrated in the accompanying drawings. In relation to describing the present disclosure, when the detailed description of the relevant known technology is determined to unnecessarily obscure the gist of the present disclosure, the detailed description may be omitted.

Terms such as "first," "second," and other numerical terms when used herein do not imply a sequence or order unless clearly indicated by the context. These terms are only used to distinguish one element from another. In addition, terms, which are specially defined in consideration of the configurations and operations of the embodiments, are given only to explain the embodiments, and do not limit the scope of the embodiments.

FIG. 1 illustrates a 5G network-based cloud system 1000 according to an embodiment of the present disclosure.

Referring to FIG. 1, the cloud system 1000 may include an electronic device 100, a mobile terminal 200, an information providing system 300, various devices 400, and a 5G network 500.

The electronic device 100 may directly receive input of speech of an enquirer through a microphone (123 of FIG. 2) and recognize query information of the enquirer from the inputted speech, or may receive input of query information in the form of text to recognize the query information.

The electronic device 100 may include a chatbot, which is a computer program that performs a specific operation through conversation with humans by means of speech or text, and a plurality of chatbots may be included in the electronic device 100. Each chatbot may include its own profile information to perform a conversation service.

The electronic device 100 may transmit and receive data to and from a server and various terminals capable of performing communications through the 5G network 500. In particular, the electronic device 100 may perform data communications with the server and terminals by using at least one of enhanced mobile broadband (eMBB), ultra-reliable and low latency communications (URLLC), or massive machine-type communications (mMTC), through the 5G network 500.

eMBB is a mobile broadband service providing, for example, multimedia content and wireless data access. In addition, improved mobile services, such as hotspots and wideband coverage for accommodating the rapidly increasing mobile traffic, may be provided through eMBB. Through a hotspot, high-volume traffic may be accommodated in an area where user mobility is low and user density is high. Through wideband coverage, a wide and stable wireless environment and user mobility can be secured.

The URLLC service defines more stringent requirements than existing LTE in terms of reliability and transmission delay of data transmission and reception. A 5G service for manufacturing process automation in industrial fields, telemedicine, remote surgery, transportation, and safety, may correspond to an URLLC service.

mMTC is a transmission delay-insensitive service that requires a relatively small amount of data transmission. mMTC enables a much larger number of terminals, including, for example, sensors, than general mobile cellular phones to be simultaneously connected to a wireless access network. Here, the communication module of a terminal should be relatively cheap. In addition, improved power efficiency and power saving technology are required to enable the terminal to operate for several years without replacement or recharge of a battery.

The mobile terminal 200 may communicate with the electronic device 100 through the 5G network 500. The mobile terminal 200 may include mobile devices, such as a mobile phone, a smartphone, and a wearable device, such as a smartwatch, smart glasses, and a head-mounted display (HMD).

The information providing system 300 may provide the electronic device 100 with various services, and may be able to access information that is difficult for the electronic device 100 to access.

The information providing system 300 may be embodied as a cloud, and thus may include a plurality of servers. The information providing system 300 may generate an AI-related model by performing an AI-related operation that is too difficult or takes a relatively long time for the electronic device 100 to perform, to thereby provide relevant information to the electronic device 100.

For example, the information providing system 300 may generate, through an AI operation, response information that is to be provided by a plurality of chatbots with respect to query information of a user inputted through the electronic device 100, and provide the generated response information to the electronic device 100. In addition, the information providing system 300 may provide the electronic device 100 with a pre-trained query response model.

The various devices 400 may include, for example, a personal computer (PC) 400a, an autonomous vehicle 400b, and a home robot 400c. The various devices 400 may be connected to, for example, the electronic device 100, the mobile terminal 200, and the information providing system 300 through the 5G network 500 in a wired or wireless manner.

The 5G network 500 may include, for example, a 5G mobile communication network, a local area network, and the Internet, and provide communication environments for the devices in a wired or wireless manner.

FIG. 2 is a block diagram illustrating a configuration of an electronic device 100 according to an embodiment of the present disclosure. The electronic device 100 may include a transceiver 110, an input interface 120, a sensor 130, an output interface 140, a memory 150, a power supplier 160, and a processor 190. Since the components shown in FIG. 2 are not necessarily essential for embodying the electronic device 100, the electronic device 100 described in this specification may have more or fewer components than those listed above.

The transceiver 110 may include a wired and wireless communication module capable of communicating with the mobile terminal 200 and the information providing system 300.

In an alternative embodiment, the wireless transceiver 110 may be equipped with a module for global system for mobile communication (GSM), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, and near field communication (NFC).

In a selective embodiment, the processor 190 may transmit query information to the information providing system 300 through the transceiver 110 and receive response information of one or more respondents (for example, a chatbot) responding to the query information.

The input interface 120 may include a camera 121 configured to receive input of a video signal, a microphone 123 configured to receive an audio signal, and an information receiver 125 configured to receive input of information from a user. Here, the camera 121 or the microphone 123 may be regarded as a sensor, and thus a signal obtained by the camera 121 or the microphone 123 may be referred to as sensing data or sensor information The information receiver 125 may be used as a separate input means from the camera 121 and the microphone 123, but depending on embodiments, may include all input means of the electronic device 100 including the camera 121 and the microphone 123. The information receiver 125 may include various configurations for receiving information. As an example, the information receiver 125 may receive information inputted through a touchscreen.

The input interface 120 may obtain, for example, learning data for model learning and input data to be used when obtaining an output using a learning model. The input interface 120 may obtain raw input data. Here, for a pre-processing of the raw input data, the processor 190 may extract an input feature as a preprocessing of the raw input data.

The sensor 130 may obtain at least one of internal information of the electronic device 100, information on the surroundings of the electronic device 100, or user information, by using various sensors.

Here, the sensor 130 may include, for example, a satellite-based location sensor, a distance detection sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (lidar) sensor, a barometer sensor, and a radar sensor.

The output interface 140 may generate an output related to visual, auditory, or tactile senses. The output interface 140 may include an optical output interface and a display 141 configured to output visual information, a speaker 143 configured to output auditory information, and a haptic module configured to output tactile information.

The memory 150 may store data that support various functions of the electronic device 100. The memory 150 may store therein a plurality of application programs (or applications) to be driven in the electronic device 100, data for operations of the electronic device 100, and commands.

The memory 150 may store therein a query response model 151. The query response model 151 may be a pre-trained model, and may be trained in the electronic device 100 and/or the information providing system 300 and be stored in the memory 150.

In a selective embodiment, the query response model may not be limited to an AI model, but may include a model required for natural language interpretation, a database storing a large amount of response information for responding to query information, and a model for selecting response information.

The power supplier 160 may receive external power source and internal power source under the control of the processor 190, to thereby supply power source to each component. The power supplier 160 may include a battery, which may be a built-in battery or a replaceable battery. The battery may be charged via a wired or wireless charging method, and the wireless charging method may include a magnetic induction method or a magnetic resonance method.

The processor 190 may be a module which controls components of the electronic device 100, and may include one processor or a plurality of processors. The processor 190 may refer to a data processing device embedded in hardware, having a physically structured circuit to execute functions expressed as an instruction or code included in a program. As examples of the data processing device embedded in hardware, a microprocessor, a central processing unit (CPU), a processor core, a multiprocessor, an application-specific integrated circuit (ASIC), and a field programmable gate array (FPGA) may be included, but the scope of the present disclosure is not limited thereto.

Hereinafter, a training (learning) process and an application process of the query response model 151 according to an embodiment of the present disclosure will be described referring to FIGS. 3 and 4.

FIG. 3 is a block diagram for explaining a method for generating the query response model 151 through training according to an embodiment of the present disclosure, and FIG. 4 is a block diagram for explaining a method for applying the generated query response model 151 according to an embodiment of the present disclosure.

First, the query response model 151 may perform a training step Tr and an application step App. The training step Tr may be a step of generating the query response model 151, and the application step App may be a step of actually using the generated query response model 151.

The training step Tr may be performed in the information providing system 300, but depending on embodiments, may be performed in the electronic device 100.

In the training step Tr, the query response model 151 may receive input of a plurality of pieces of query information from a plurality of enquirers (310: 3101-310N). For convenience of explanation, only first query information 320A of a first enquirer 3101 will be representatively described in the present specification, but query information of other enquirers 310 may also be inputted to the query response model 151.

The query response model 151 may receive input of the first query information 320A of the first enquirer 3101. In detail, the query response model 151 may convert speech of the first enquirer 3101 into text information by using a speech to text (STT) algorithm, to receive input of the first query information 320A. Depending on embodiments, the query response model 151 may receive input of the first query information 320A in the form of text information or may receive a speech signal.

In addition, the query response model 151 may receive input of profile information 320B of the first enquirer 3101. The profile information 320B of the first enquirer 3101 may include at least one of identification information, sex information, age information, occupation information, interest field information, or residential area information The profile information 320B may be mapped to a chatbot. When generating response information, the query response model 151 may take into consideration the profile information 320B of the first enquirer 3101.

In the present specification, only the first enquirer 3101 is described in detail, but the query response model 151 may receive input of all profile information of the first enquirer 3101 to Nth enquirer 310N to generate response information that is customized for each enquirer.

In addition, the query response model 151 may receive input of profile information 330 of at least one first respondent. That is, the query response model 151 may receive input of a plurality of pieces of profile information (330: 3301, 3302, ... ) of a plurality of first respondents responding to the first query information 320A.

Then, the query response model 151 may output a plurality of pieces of first response information (340: 3401, 3402, ... ) corresponding to each of the first respondents. The first response information 340 may be response information that is mapped one-to-one to the profile information 330 of the first respondents. Accordingly, the query response model 151 may generate first response information 340 corresponding to each of the plurality of first respondents, and the number of the generated pieces of first response information 340 may be the number of chatbots.

The query response model 151 may generate first response information responding to query information of the second to Nth enquirers 310 as well as the first enquirer 3101.

Then, as for the first enquirer 3101 only, the query response model 151 may receive input of the first query information 320A, the profile information 320B of the first enquirer, the profile information 330 of the first respondent, the first response information 340, and profile information 350 of a second respondent, to generate second response information 360 which is a response to the first query information 320A and which is based on the first response information 340. Here, the second response information 360 may be based on all pieces of the first response information 340, and in a selective embodiment, the second response information 360 may be based on the last one piece of the first response information 340.

The query response model 151 may generate first response information and second response information responding to query information of not only the first enquirer 3101 but also other enquirers.

Here, in a case in which the query response model 151 is embodied as an AI-based model, the query response model 151 may verify the generated second response information 360 by inputting the second response information 360 as label information in the training step Tr. Also, the query response model 151 may reset a weighted value and a bias. However, the query response model 151 may not be embodied as a machine learning-based model. In addition, if necessary for an embodiment, the query response model 151 may include a natural language interpretation model and a response information selection model.

Referring to FIG. 4, the query response model 151 may be actually used in the application step App. The query response model 151 may be performed in the information providing system 300, but may be embodied in the electronic device 100. Hereinafter, explanation will be made on the assumption that the query response model 151 is embodied in the electronic device 100.

The query response model 151 may generate response information corresponding to query information of an enquirer. When the application step App is performed in the electronic device 100, the query response model 151 may be controlled by the processor 190.

Here, the processor 190 may provide the query response model 151 with second query information 420A, profile information 420B of a second enquirer, and at least one piece of third response information 430 responding to the second query information 420A. Here, the second query information 420A may be query information in the application step App.

Then, the processor 190 may generate fourth response information 460 based on the third response information 430 by using the query response model 151. In detail, the processor 190 may receive input of the second query information 420A, the profile information 420B of the second enquirer, at least one piece of third response information 430 for the second query information 420A, profile information 440 of a third respondent, and profile information 450 of a fourth respondent, to thereby generate the fourth response information 460 of the fourth respondent.

Here, the third response information 430 may be response information outputted after providing the query response model 151 with the second query information 420A, the profile information 420B of the second enquirer, and the profile information 440 of the third respondent who provides the third response information 430, before the fourth response information 460 is generated.

In a selective embodiment, the processor 190 may only generate the third response information 430, without generating the fourth response information 460.

In the training step Tr and the application step App, the profile information of the enquirers and the respondents may include at least one of identification information, sex information, age information, occupation information, interest field information, or residential area information.

As described above, as the query response model 151 is applied, various responses may be simultaneously provided for a certain query, and thus in the present disclosure, there is no need to select a chatbot that performs a specific response.

FIG. 5 is an illustration for explaining an interface for selecting a respondent from among a plurality of respondents having different profile information from one another according to an embodiment of the present disclosure.

Referring to FIG. 5, the electronic device 100 may include a display 141. The electronic device 100 may automatically or manually select a respondent and profile information of a respondent.

The electronic device 100 may set profile information of a respondent according to user input. The processor 190 may output a plurality of respondents and profile information of the plurality of respondents on the display 141.

Each of respondents A to D (520: 520A to 520D) may be a third respondent or a fourth respondent as described above in the application step App. Here, profile information of the respondents A to D (520: 520A to 520D) may include identification information (e.g., name), photo information, sex information, age information, occupation information, interest field information, residential area information, and response option information (530).

The response option information 530 may include option information determining whether each of the respondents 520 is a third respondent ("1") or a fourth respondent ("2"), and if the respondents 520A to 520C are third respondents, the response option information 530 may show whether a respondent is a first ("F"), second ("S"), or third ("T") respondent, in terms of response order, among a plurality of the third respondents. The response option information 530 may be determined by user input. Specifically, referring to the response option information 530 in FIG. 6, respondent A 520A is a third respondent who will provide response information first among the third respondents, and respondent C 520C may be a third respondent who will provide response information second among the third respondents. Respondent D 520D may be a fourth respondent who will provide response information last.

The processor 190 may receive, through the information receiver 125, a command for selecting a third respondent and a fourth respondent, and may receive, through the information receiver 125, a selection command for selecting at least one from among a plurality of third respondents.

According to another embodiment, the processor 190 may automatically select a third respondent and a fourth respondent, and automatically set the order of response of the third respondent and the fourth respondent.

FIGS. 6 and 7 are illustrations for explaining an operation of an electronic device providing various responses to a query in a certain field according to an embodiment of the present disclosure.

Referring to FIG. 6. the processor 190 may recommend third respondents 520A and 520C capable of providing third response information and profile information of the third respondents 520A and 520C to an enquirer 610, on the basis of profile information of the enquirer 610 (for example: the enquirer is a female office worker in her 30s). In addition, the processor 190 may recommend, to the enquirer 610, a fourth respondent 520D and profile information of the fourth respondent 520D on the basis of the profile information of the enquirer 610 and the profile information of the third respondents 520A and 520C.

That is, the processor 190 may recommend, to the enquirer, the third respondents 520A and 520C who would provide the best responses, the profile information of the third respondents 520A and 520C, the fourth respondent 520D, and the profile information of the fourth respondent 520D, on the basis of the sex information, age information, occupation information, interest field information, and/or residential area information of the enquirer 610.

In addition, if a plurality of third respondents 520A and 520C are present, the processor 190 may determine the order of response of the plurality of third respondents 520A and 520C on the basis of query information (e.g., "I'm not friendly to my boyfriend"). For example, the processor 190 may determine the order of response in such a manner that the third respondent 520A who would give the best response comes first and the third respondent 520C who would give the second best response comes second.

Depending on the embodiment, the processor 190 may cause the third respondents 520A and 520C have a conversation on the basis of the query information of the enquirer 610. Here, the processor 190 may determine response information of the fourth respondent 520D such that the fourth respondent 520D agrees with at least one of the third respondents 520A and 520C.

The processor 190 may determine the response information of the fourth respondent 520D on the basis of response information 520C1 of the third respondent 520C whose response comes last. Here, the query response model 151 may be trained and applied in such a manner that the fourth response information of the fourth respondent 520D is only based on the response information of the third respondent whose response comes last among the plurality of third respondents.

Referring to FIG. 7, the processor 190 may recommend suitable respondents with respect to query information 710A of an enquirer 710 (see 720).

When the enquirer 710 accepts the recommended respondents (see 710B), each of third respondents 730 to 750 may provide response information 730A to 750A corresponding to the query information 710A.

A fourth respondent 760 may provide response information 760A responding to the query information 710A of the enquirer 710, wherein the response information 760A may be based on the response information 730A to 750A of the third respondents 730 to 750.

In addition, the processor 190 may generate the fourth response information 760A of the fourth respondent 760 in such a manner that the fourth respondent 760 agrees with at least one of the third respondents 730 to 750, or in such a manner that the fourth respondent 760 agrees only with the last response information 750A among the response information 730A to 750A of the third respondents 730 to 750.

FIG. 8 is a sequence diagram for explaining a method for operating an electronic device according to an embodiment of the present disclosure.

The electronic device 100 may provide a pre-trained query response model with query information of an enquirer, profile information of the enquirer, and at least one piece of first response information responding to the query information (S810; providing step).

Next, the electronic device 100 may generate second response information responding to the query information on the basis of the first response information (S820; generating step).

Here, before S810 (providing step), the electronic device 100 may provide the query response model with the query information, the profile information of the enquirer, and profile information of at least one first respondent who provides the first response information, to thereby generate the first response information.

The first respondent and the first response information described in FIG. 8 may correspond to the third respondent and the third response information in FIG. 4, and second response information of FIG. 8 may be mapped to the fourth response information of FIG. 4.

The query response model 151 may be a learning model which is pre-trained, in a training step, to receive input of query information of at least one enquirer, profile information of each of the at least one enquirer, one or more pieces of third response information corresponding to each piece of the query information, profile information of a third respondent who provides the third response information, and profile information of a fourth respondent, to thereby generate fourth response information which is response information of the fourth respondent and which is based on the third response information.

Here, the third respondent and the third response information may correspond to the first respondent and the first response information of FIG. 3, and the fourth respondent and the fourth response information may correspond to the second respondent and the second response information of FIG. 3.

In another embodiment, in a training step, the query response model 151 may receive input of only the third response information that comes last among a plurality of pieces of third response information, to thereby generate fourth response information.

Here, the profile information of the enquirers and the respondents includes at least one of identification information, sex information, age information, occupation information, interest field information, or residential area information, but the scope of the present disclosure is not limited thereto.

In an application step, the electronic device 100 may display at least one first respondent capable of providing first response information and profile information of the first respondent, and may receive a selection command for selecting at least one of the at least one first respondent.

Also, the electronic device 100 may recommend a first respondent capable of providing first response information and profile information of the first respondent, on the basis of the profile information of the enquirer.

In addition, if a plurality of first respondents are present, the electronic device 100 may determine the order of response of the plurality of first respondents, on the basis of the query information. Furthermore, the electronic device 100 may provide an interface such that a plurality of first respondents can have a conversation, on the basis of the query information of the enquirer.

Further, the electronic device 100 may determine second response information of a second respondent in such a manner that the second respondent agrees with at least one of a plurality of first respondents. Also, the electronic device 100 may determine second response information of a second respondent on the basis of response information of a first respondent who comes last among a plurality of first respondents.

The present disclosure described above can be embodied as computer-readable codes on a medium on which a program is recorded. The computer-readable medium may include all kinds of recording devices in which computer-readable data is stored. The computer readable medium may be, for example, a hard disk drive (HDD), a solid state disk (SSD), a silicon disk drive (SDD), read only memory (ROM), random access memory (RAM), CD-ROM, a magnetic tape, a floppy disk, or an optical data storage device. In addition, the computer may include the processor 190 of the electronic device 100.

In the foregoing, while specific embodiments of the present disclosure have been described for illustrative purposes, the scope or spirit of the present disclosure is not limited thereto, it will be understood by those skilled in the art that various changes and modifications may be made to other specific embodiments without departing from the spirit and scope of the present disclosure. Therefore, the scope of the present disclosure is not limited to the above-described exemplary embodiments, but shall be defined by the technical thought as recited in the following claims.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. An electronic device, comprising:
   a memory configured to store a pre-trained query response model;
   a plurality of chatbots each configured to perform a specific operation through conversation with an enquirer, wherein each of the plurality of chatbots has a different profile from each other,
   an information receiver;
   a display; and
   a processor configured to:
   generate, based on a profile information of a first chatbot among the plurality of chatbots, at least one piece of first conversation corresponding to a query information of the enquirer,
   provide the pre-trained query response model with the query information, a profile information of the enquirer, the profile information of the first chatbot, a profile information of a second chatbot among the plurality of chatbots, and the at least one piece of first conversation corresponding to the query information, wherein the profile information of the enquirer consists of at least one of identification information, sex information, age information, occupation information, interest field information, or residential area information,
   generate, based on the profile information of the second chatbot, second conversation which is a response to the query information based on the at least one piece of first conversation and the profile information of the first chatbot and the second chatbot using the pre-trained query response model,
   cause the display to display at least the first chatbot, the at least one piece of first conversation associated with the first chatbot, the profile information of the first chatbot, the second chatbot, the second conversation associated with the second chatbot, and the profile information of the second chatbot, and
   receive, through the information receiver, a selection command for selecting at least one of the first chatbot or the second chatbot.

2. The electronic device according to claim 1, wherein the at least one piece of first conversation is response information that is outputted after providing the pre-trained query response model with the query information, the profile information of the enquirer, and the profile information of the first chatbot associated with the at least one piece of first conversation, before the second conversation is generated.

3. The electronic device according to claim 1, wherein the pre-trained query response model is a learning model which is pre-trained, in a training step, to receive input of query information of at least one enquirer, the profile information of each of the at least one enquirer, one or more pieces of third conversation corresponding to each piece of the query information, a profile information of a third chatbot associated with the third conversation, and a profile information of a fourth chatbot, to thereby generate fourth conversation which is response information associated with the fourth chatbot and which is based on the third conversation.

4. The electronic device according to claim 3, wherein in the training step, the profile information of enquirers and the plurality of chatbots comprises at least one of identification information, sex information, age information, occupation information, interest field information, or residential area information.

5. The electronic device according to claim 4, wherein the processor is further configured to recommend the first chatbot associated with the at least one piece of first conversation and the profile information of the first chatbot based on the profile information of the enquirer.

6. The electronic device according to claim 5, wherein the processor is further configured to, when a plurality of first chatbots are present, determine an order of response of the plurality of first chatbots based on the query information.

7. The electronic device according to claim 6, wherein the processor is further configured to cause the plurality of first chatbots to have a conversation with one another on based on the query information of the enquirer.

8. The electronic device according to claim 7, wherein the processor is further configured to determine the second conversation associated with the second chatbot such that the second chatbot agrees with at least one of the plurality of first chatbots.

9. The electronic device according to claim 7, wherein the processor is further configured to determine the second conversation associated with the second chatbot based on conversation of a last chatbot of the plurality of first chatbots.

10. A method for operating an electronic device, comprising:
    generating, based on a profile information of a first chatbot among a plurality of chatbots each configured to perform a specific operation through conversation with an enquirer, at least one piece of first conversation corresponding to query information of an enquirer, wherein each of the plurality of chatbots has a different profile from each other;
    providing a pre-trained query response model with query information of the enquirer, a profile information of the enquirer, the profile information of the first chatbot, a profile information of a second chatbot among the plurality of chatbots, and at least one piece of first conversation corresponding to the query information, wherein the profile information of the enquirer consists of at least one of identification information, sex information, age information, occupation information, interest field information, or residential area information;
    generating, based on the profile information of the second chatbot, second conversation that responds to the query information based on the at least one piece of first conversation and the profile information of the first chatbot and the second chatbot using the pre-trained query response model;
    displaying at least the first chatbot, the at least one piece of first conversation associated with the first chatbot, the profile information of the first chatbot, the second chatbot, the second conversation associated with the second chatbot, and the profile information of the second chatbot; and receive, through an information receiver, a selection command for selecting at least one of the first chatbot or the second chatbot.

11. The method according to claim 10, wherein the at least one piece of first conversation is response information that is outputted after providing the pre-trained query response model with the query information, the profile information of the enquirer, and the profile information of the first chatbot associated with at least one piece of first conversation, before the second conversation is generated.

12. The method according to claim 10, wherein the pre-trained query response model is a learning model which is pre-trained, in a training step, to receive input of query information of at least one enquirer, the profile information of each of the at least one enquirer, one or more pieces of third conversation corresponding to each piece of the query information, a profile information of a third chatbot associated with the third conversation, and a profile information of a fourth chatbot, to thereby generate fourth conversation which is response information associated with the fourth chatbot and which is based on the third conversation.

13. The method according to claim 12, wherein in the training step, the profile information of the enquirer and the plurality of chatbots comprises at least one of identification information, sex information, age information, occupation information, interest field information, or residential area information.

14. The method according to claim 13, further comprising recommending the first chatbot associated with the at least one piece of first conversation and the profile information of the first chatbot based on the profile information of the enquirer.

15. The method according to claim 14, further comprising, when a plurality of first chatbots are present, determining an order of response of the plurality of first chatbots based on the query information.

16. The method according to claim 15, further comprising causing the plurality of first chatbots to have a conversation with one another based on the query information of the enquirer.

17. The method according to claim 16, further comprising determining the second conversation associated with the second chatbot such that the second chatbot agrees with at least one of the plurality of first chatbots.

18. The method according to claim 16, further comprising determining the second conversation associated with the second chatbot based on conversation of a last chatbot of the plurality of first chatbots.

* * * * *